Oct. 18, 1938.   L. B. HALL ET AL   2,133,509
MICROSCOPE
Filed July 8, 1936

LEIGH B. HALL
HENRY F. KURTZ
INVENTOR

BY
ATTORNEYS

Patented Oct. 18, 1938

2,133,509

UNITED STATES PATENT OFFICE 2,133,509

MICROSCOPE

Leigh B. Hall and Henry F. Kurtz, Rochester, N. Y., assignors to Bausch & Lomb Optical Company, Rochester, N. Y., a corporation of New York Application July 8, 1936, Serial No. 89,603

3 Claims. (Cl. 88—39)

The present invention relates to microscopes and more particularly to binocular microscopes of variable power.

One of the objects of the present invention is to provide a new and improved means for varying the power of a binocular microscope. A further object is to provide a multiple objective mounting means for binocular microscopes in which the objectives move so as not to interfere with large specimens such as culture dishes or the like. These and other objects and advantages reside in certain novel features of construction, arrangement and combination of parts as will hereinafter be more fully set forth and pointed out in the appended claims.

Referring to the drawing.

Figure 1:
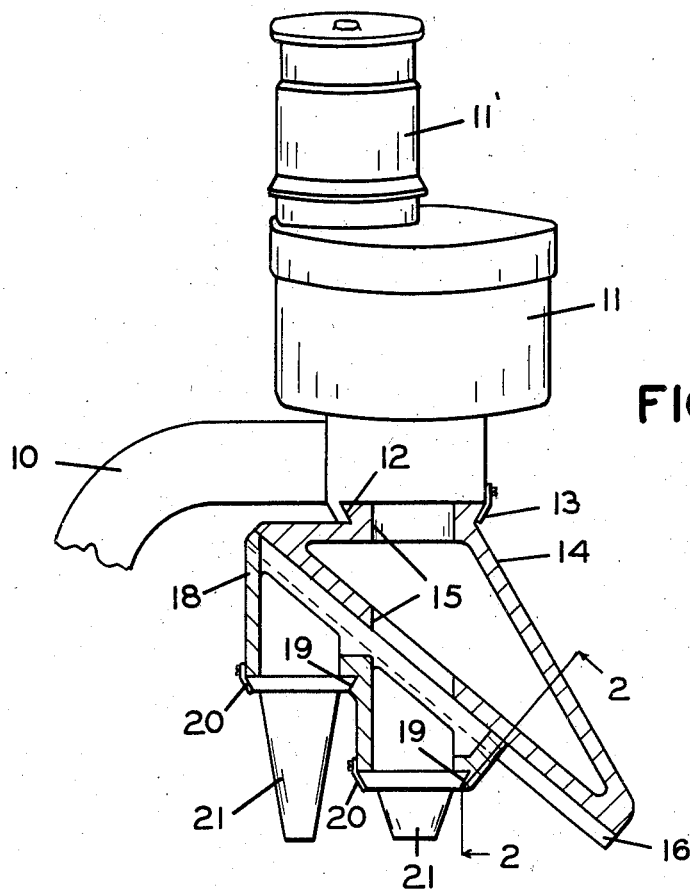
Fig. 1 is a side elevation of a microscope embodying this invention with parts in section.
Figure 2:
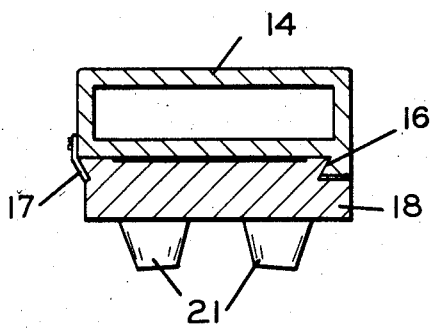
Fig. 2 is a section taken on line 2—2 of Fig. 1.

In the embodiment illustrated 10 indicates a support which is vertically adjustable on a base as is well known to those skilled in the art. Secured on the upper end of the arm 10 are two prism housings 11 and two eye pieces 11'. The particular structure of the prism systems in the housings 11 forms no part of the present invention and they may be of any well known type such as that disclosed in Patent No. 1,225,167 issued May 8, 1917, to W. L. Patterson et al.

Beneath the prism housings 11, the arm 10 has a dove tailed guide 12 the forward member of which is preferably provided by a removable plate or gib 13 as is well known in the art. A body member 14 is removably mounted in the guide 12 and, in the embodiment shown, this member 14 is a hollow casting provided with two apertures 15 in alignment with the optical axis of the prism systems in the housings 11. The bottom of the body member 14 is formed as an inclined dove tailed track 16 with the removable plate or gib 17 preferably forming one side thereof.

An objective carrier 18 is slidably mounted in the track 16 and has a plurality of guides 19 in spaced, parallel stepped planes. Each of the guides 19 is of dove tailed form and preferably has one side formed by a removable plate or gib 20. In microscopes of this type, the objectives 21 are of different lengths. According to the present invention, the longest objective 21 is placed in the highest guide 19 and the shortest objective 21 in the lowest guide 19. Thus, when the objective carrier 18 is moved to bring the different objectives into alignment with the optical axis of the prism systems in the housings 11, the longer objectives will be moved vertically as well as laterally and will thus clear objects such as culture dishes on the stage of the microscope.

From the foregoing, it will be apparent that we are able to attain the objects of our invention and provide a microscope having an improved objective changing system in which the objectives move so as not to interfere with objects on the stage of the microscope. Various modifications can, of course, be made without departing from the spirit of our invention or the scope of the appended claims.

We claim:

1. In a microscope a support, an ocular carried by said support, a body member carried by said support beneath said ocular, a track on the lower surface of said body member, said track being longitudinally inclined at a substantial angle and transversely perpendicular to the optical axis of the ocular, an objective carrier slidably mounted on said track, said objective carrier having a plurality of guides in parallel stepped relation, perpendicular to the optical axis of the ocular, and a plurality of objective lenses of different mechanical lengths, the longest lens being mounted in the highest guide.

2. In a microscope, a support, an ocular carried by said support, a body member carried by said support beneath said ocular, a track on the lower surface of said body member, said track being longitudinally inclined at a substantial angle and transversely perpendicular to the optical axis of the ocular, an objective carrier slidably mounted on said track, said objective carrier having a plurality of guides in parallel stepped relation, perpendicular to the optical axis of the objective, and means for detachably securing objective lenses in said guides.

3. A binocular microscope comprising a support, a pair of oculars mounted on said support with their optical axes lying in a single plane, a body member carried by said support, a track on the lower surface of said body member, said track being longitudinally inclined and transversely perpendicular to the plane of said axes, an objective carrier slidably mounted on said track, said objective carrier having a plurality of guides in parallel stepped relation longitudinally and transversely perpendicular to the plane of said axes, means for detachably securing a mount in each guide, and means for securing a pair of matched objectives in each guide, said objectives being mounted one on the optical axis of each ocular.

LEIGH B. HALL.
HENRY F. KURTZ.